United States Patent

[11] 3,577,137

[72] Inventor James Brennan, Jr.
Houston, Tex.
[21] Appl. No. 788,178
[22] Filed Dec. 31, 1968
[45] Patented May 4, 1971
[73] Assignee Texas Instruments, Incorporated
Dallas, Tex.

[54] TEMPERATURE COMPENSATED ELECTRONIC DISPLAY
20 Claims, 6 Drawing Figs.

[52] U.S. Cl. .......... 340/324, 178/30, 219/216
[51] Int. Cl. .......... H04l 15/34
[50] Field of Search .......... 178/30; 340/324; 219/201, 216; 346/76

[56] References Cited
UNITED STATES PATENTS

| | | | |
|---|---|---|---|
| 3,476,877 | 11/1969 | Perkins et al. | 178/30X |
| 3,495,070 | 2/1970 | Zissen | 219/216 |
| 3,501,615 | 3/1970 | Merryman et al. | 219/201 |

*Primary Examiner*—John W. Caldwell
*Assistant Examiner*—David L. Trafton
*Attorneys*—Harold Levine, James O. Dixon, Andrew M. Hassell, Rene E. Grossman, Melvin Sharp, Richards, Harris and Hubbard and V. Bryan Medlock, Jr.

ABSTRACT: A high speed electronic display system having a circuit for adjusting the power applied to a thermal display matrix during a printing cycle based upon the temperature of the print head. In one embodiment, the temperature of a matrix of air isolated semiconductor means is sensed by a diode diffused in an adjacently mounted integrated circuit immediately prior to the print cycle, and the power applied to drive the matrix during the print cycle is adjusted in accordance with the offset voltage across the diode. In another embodiment, the temperature of the matrix of elements is estimated using a temperature sensing element located on the heat sink and correcting the sensed temperature to compensate for the repetition rate of the print cycle, the number of elements activated during each print cycle, the rate at which heat is transferred to the heat sensing element, and the rate at which heat is dissipated from the heat sensing element. There is a single sensor for the thermal display matrix.

INVENTOR
JAMES BRENNAN, JR.

E. Mickey Hubbard
ATTORNEY

INVENTOR
JAMES BRENNAN, JR.

E. Mickey Hubbard
ATTORNEY

TEMPERATURE COMPENSATED ELECTRONIC DISPLAY

This invention relates generally to electronic display devices, and more particularly relates to electronically controlled thermal display devices such as printers.

It is known in the art to fabricate an electronic display device comprised of a matrix of very small air isolated semiconductor mesas mounted on a ceramic chip by a thermally insulating layer of epoxy. Each of the mesas includes a diffused resistor in the collector circuit of a diffused transistor. Current through the collector resistor is controlled by applying a control pulse to the base of the transistor, thus heating the individual mesa to an elevated temperature. The mesas are selectively energized by a character generating logic circuit in a manner to spacially reproduce the character which may be reviewed by changing the color of a thermochromatic material or by changing the color of thermally sensitive paper disposed adjacent the matrix. As originally conceived, designed and used, these devices were operated in a manner such that the mesas always cooled approximately to the ambient temperature between print cycles. Attempts to use the devices at high repetition rates for printing resulted in unsatisfactory print densities.

This invention is concerned with a system utilizing these electronic display devices in such a manner as to achieve uniform density displays or printing while operating the devices at a high repetition rate. More particularly, the invention is concerned with a system which adjusts the power to the level during each print cycle necessary to produce a uniform maximum temperature during the print cycle.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
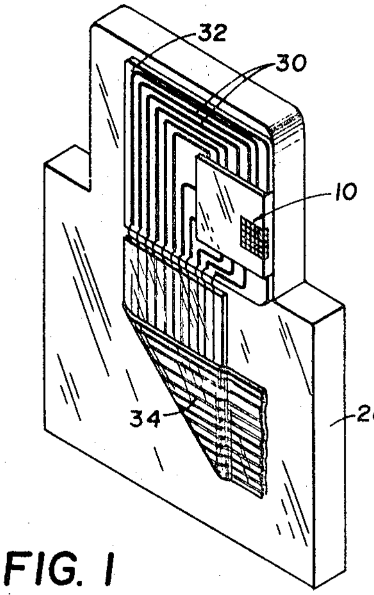
FIG. 1 is an isometric view of an electronic print head carriage assembly in accordance with the present invention.
Figure 2:
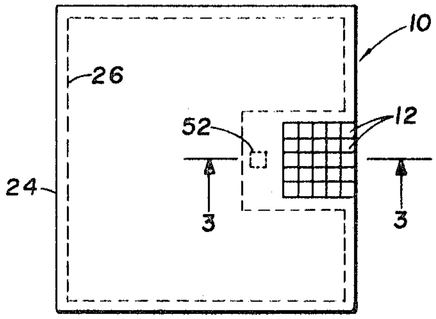
FIG. 2 is an enlarged side view of the electronic print head of FIG. 1.
Figure 3:
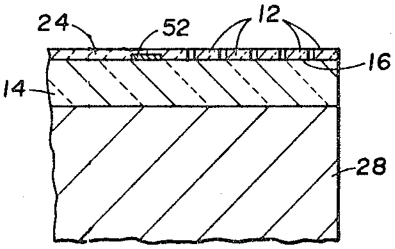
FIG. 3 is a sectional view taken substantially on line 3–3 of FIG. 2.

Referring now to FIGS. 1—3, a thermal print head of the type described and claimed in various aspects in copending U.S. applications, Ser. No. 650,821, filed July 3, 1967, entitled "Thermal Displays Using Air Isolated Integrated Circuits and Methods of Making Same," and U.S. Pat. No. 3,501,615, issued Mar. 17, 1970, entitled "Integrated Heater Element Array and Drive Matrix and Method of Making Same," each assigned to the assignee of the present invention, is indicated by the reference numeral 10. The print head 10 is comprised of a 5×5 matrix of the semiconductor mesas 12 which are thermally isolated one from the other by airgaps as best seen in FIG. 3 and which are bonded to a ceramic chip 14 by a thermally insulating epoxy layer 16. A transistor 18 and a resistor 20 (see FIG. 4) are diffused in the interior face of each mesa 12 adjacent the epoxy layer 16. A buffer transistor 22 for each of the 25 mesas 12 is diffused in the face of a semiconductor chip 24 generally in the area designated by the dotted outlines 26 and the circuits interconnected by thin metallic film leads (not illustrated) on the surface of the semiconductor mesas 12 and the chip 24 adjacent the epoxy layer 16. The ceramic chip 14 is then bonded to a metallic heat sink 28. The leads to the bases of the buffer transistors 22 terminate around the periphery of the semiconductor chip 24 and are bonded to leads 30 on a printed circuit template 32 mounted on the heat sink 28. The leads 30 on the printed circuit are soldered to the leads of a multilead strap cable 34. The print head assembly is designed to be stepped across a thermally sensitive page to print a line of characters at a high rate.

In order to obtain uniform print density on the thermally sensitive paper when printing at a high rate, it is necessary for the activated elements of the mesas to be heated to the same maximum temperature during each print cycle. In normal use, the prints may be operated at a slow, inconsistent rate when activated from a keyboard, or at a high rate when operated by a computer. At high print rates, the temperature to which the mesas cool between print cycles may be much greater than that during the off-duty time at a slow rate. If the same power is applied during all print cycles, the print density will vary considerably.

Figure 4:
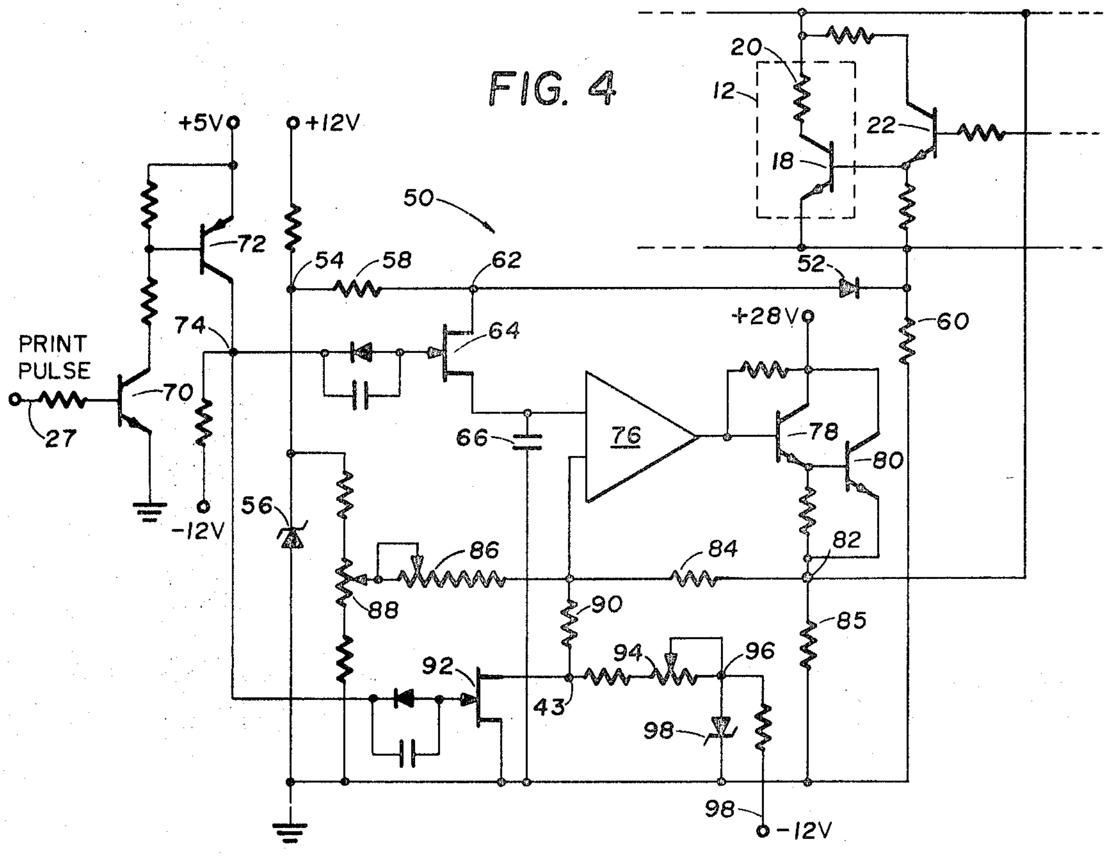
FIG. 4 is a schematic circuit diagram of a system for controlling the temperature of the device of FIGS. 1—3.

Referring now to FIG. 4, a circuit for controlling the print temperature of the mesas is indicated generally by the reference numeral 50. The circuit 50 includes a temperature sensing diode 52 which is located on the chip 24 adjacent to the matrix of mesas 12 generally in the position indicated in FIGS. 2 and 3. A constant voltage is established at point 54 by a Zener diode 56 so that current flows through resistor 58, the temperature sensing diode 52, and the common return line from all of the transistors 18 and 22 on the print head 10. The resistance of the common return is represented by resistor 60.

The voltage at point 62 is sampled through switch 64 and stored on capacitor 66 except during each negative-going print cycle applied to input 27. Thus, whenever input 27 is at a positive level so that transistors 70 and 72 are turned "on" and point 74 is positive, switch 64 is turned "on." Then during the negative-going print cycle on line 27, the switch 64 is turned "off."

The voltage on storage capacitor 66 is applied to the noninverting input of an operational amplifier 76. The output of amplifier 76 is passed through a pair of output stages 78 and 80 to an output 82 which is connected to provide collector current to all of the transistors 18 and 22 of the print head. Resistor 85 provides a load when all elements of the print head are turned "off" during a print cycle, such as would required to produce a space. A feedback resistor 84 connects the output 82 back to the inverting input of amplifier 76. The inverting input is also connected through a variable resistance 86 to the sliding contact of a voltage divider 88 which is connected across the reference Zener 56. The inverting input is also connected through a resistor 90 and a second switch 92 to ground, and alternatively through a variable resistance 94 to a voltage supply of about −9.0 volts at point 96, as established by the Zener diode 98 and the negative voltage at terminal 99. The switch 92 is also controlled by transistors 70 and 72 and thus is turned "off" during the print cycle, and "on" during the sample period.

Prior to operation of the temperature compensation circuit 50, the sliding contact of voltage divider 88 is first adjusted so that the voltage at the sliding contact is equal to the voltage at the sample point 62 when the diode 52 is at ambient temperature. This voltage is typically +0.7 volt. Next, the print pulse is activated at a slow rate and variable resistor 94 is adjusted until the output voltage at point 82 is at the level necessary to achieve the desired darkness of print. Next, the print rate is increased to the maximum anticipated rate and variable resistor 86 adjusted to achieve the same print quality, thus producing approximately the same output voltage at 82.

In the operation of the circuit 50, the average temperature of the print head is sensed by means of the voltage drop across diode 52 prior to each print cycle, and the power applied to the print head during the print cycle is then adjusted according to the previously sensed temperature. For example, when the printing rate is slow, the offset voltage across the diode 52 is approximately 0.7 volt so that 0.7 volt is stored on capacitor 66 during the sampling period when switch 64 is "on." Switch 92 is also "on" during this sampling period so that point 93 is essentially shorted to ground. This configuration results in an output voltage of approximately +3.0 volts at 82, which is sufficient to keep the amplifier from going into saturation, but not sufficiently high to produce printing. In addition, all of the print head transistors are "off" so that no printing can result. During the print cycle, switches 64 and 92 are "off" and at least part of the elements of the print head will usually be turned "on." Turning sampling switch 64 "off" prevents voltage surges at point 62 due to increased IR drop across resistor 60 and heating of the print head from being applied to the amplifier 76 with resulting inaccuracies and instabilities. Turning switch 92 "off" pulls point 93 more negative, requiring a higher voltage at the output 82 to balance the amplifier.

However, as the temperature of the diode 52 increases, due to an increase in printing rate or the nature of the characters being printed, or to a lesser extent due to an increase in the ambient temperature, the offset voltage across the diode 52 decreases, thus decreasing the voltage stored on capacitor 66 and applied to the input of amplifier 76 during the print cycle. For example, an increase in temperature in the print head of 50° C. results in a lowering of the voltage by 0.1 volt to about 0.6 volt during the print cycle so that the output voltage at 82 need not be as high as would otherwise be necessary to balance the amplifier 76. The output voltage required to balance the amplifier is further reduced by the current that then passes through resistor 86, the value of which determines the reduction in output voltage for a given increase in temperature of diode 52.

Figure 5:
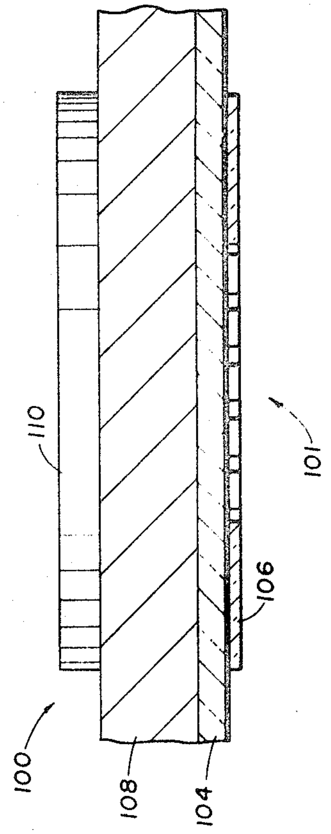
FIG. 5 is a schematic sectional view of another electronic display device in accordance with the present invention.

Referring now to FIG. 5, another electronic printing device in accordance with the present invention is indicated generally by the reference numeral 100. The device 100 is comprised of a semiconductor print head 101 of the type heretofore described which is mounted on a ceramic chip 104 by an epoxy layer 106. The ceramic chip 104 is mounted on a metallic heat sink 108 and a thermistor 110 is mounted on the backface of the heat sink. The device 100 may be used in the same manner as the device 10 of FIG. 1, or may be stationary and a thermally sensitive paper moved by the print head.

Figure 6:
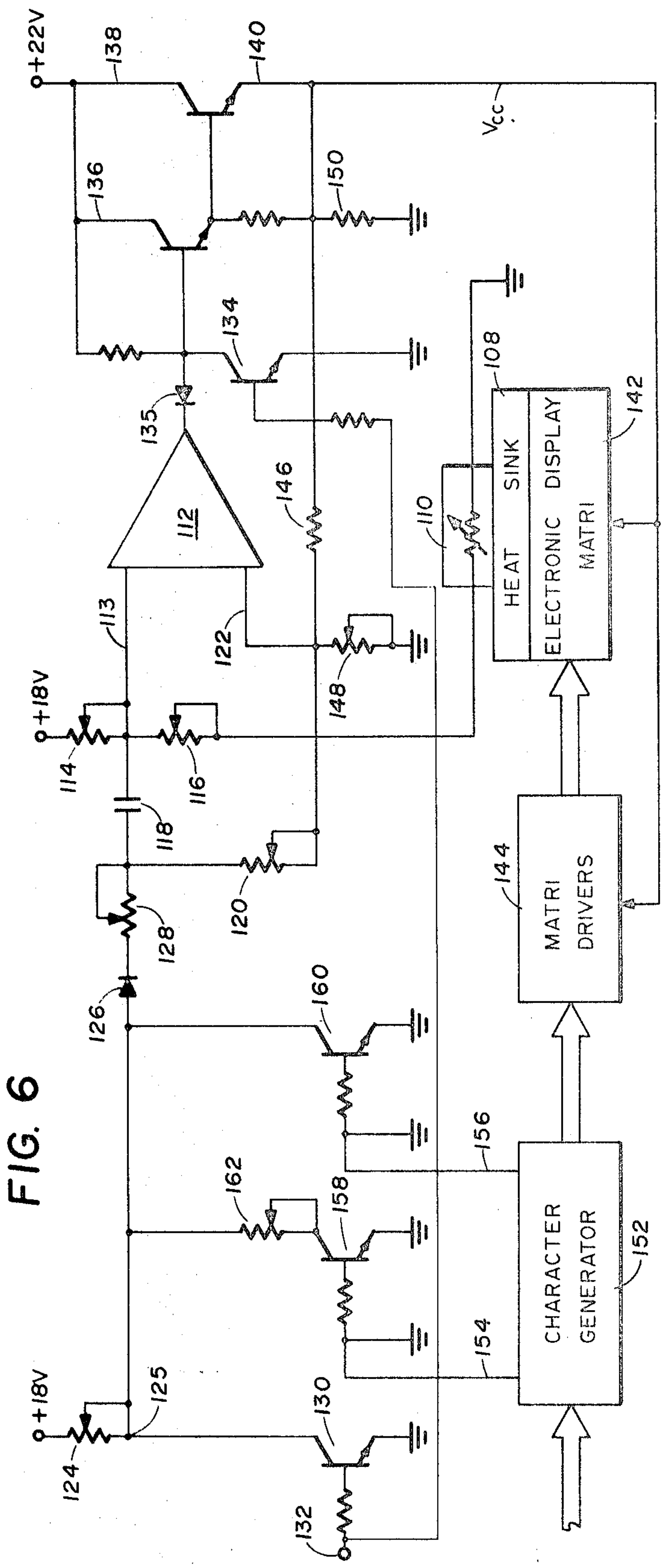
FIG. 6 is a schematic circuit diagram of another embodiment of the present invention used to control the printing temperature of the device of FIG. 5.

The temperature of the print matrix of the print head 101 is maintained at substantially a constant predetermined temperature while printing at high or low rates by the circuit illustrated in FIG. 6. The noninverting input 113 of an operational amplifier 112 is connected between variable resistors 114 and 116 in a voltage divider including the thermistor 110. The noninverting input 113 is coupled by a capacitor 118 and a variable resistor 120 to the inverting input 122. The capacitor 118 is charged through a variable resistor 124, a diode 126, and a second variable resistor 128 whenever a transistor switch 130 is turned "off" by a negative-going print cycle pulse applied at terminal 132. A second switch transistor 134 is also turned "off" by the negative-going print cycle pulse so that the output from the amplifier 112 will be applied through a diode 135 to output stages 136 and 138 to adjust the collector supply voltage $V_{CC}$ on output line 140 that is applied to drive the transistors of the matrix 142 and the matrix drivers 144 of the display device 142.

A feedback resistor 146 connects the output 140 back to the inverting input 122, and a variable resistor 148 connects the inverting input 122 to ground. A resistor 150 provides a load in the event all elements of the matrix 142 are turned "off" during a print cycle.

A character generator 152 decodes binary data received prior to the print cycle and produces outputs controlling the matrix drivers 144 in such a manner as to activate the elements of the matrix necessary to generate the desired character. The character generator also determines what number of elements have been energized to form the character and produces outputs on lines 154 and 156 to control transistor switches 158 and 160, respectively. In the specific embodiment illustrated, which uses a 25 element matrix, for example, when from zero to six elements of the matrix have been energized, the output of line 156 goes positive turning transistor 160 "on." This shunts all of the current through resistor 124 to ground, so that capacitor 118 is not charged. (Diode 126 holds the charge on capacitor 118.) The output 154 goes positive to turn transistor 158 "on" if from seven to nine elements of the matrix have been energized. Then only a portion of the current through resistor 124 is shunted to ground through variable resistor 162, thus reducing the amplitude of the voltage pulse applied to capacitor 118. If more than nine elements are energized, neither output 156 nor 154 goes to a positive voltage so that the full potential of the pulse generated when transistor 130 is turned "off" during the print cycle is applied to charge capacitor 118. Since diode 126 holds the charges on capacitor 118, the voltage discharges through resistors 120 and 148.

Assume that the display device 102 has been inactive so that the thermistor 110 is relatively cool and has a high resistivity. The noninverting input 113 of the amplifier 112 will then be at a relatively high positive voltage as a result of the voltage divider formed by resistors 114 and 116 and the thermistor 110. Prior to the application of the negative-going print cycle pulse to input 132, transistors 130 and 134 will be turned "on" so that the voltage at point 125 will be near ground potential and transistor 134 will be "on" so that the output 140 will be at approximately 0 volts and the amplifier 112 will be in saturation.

Assume now that the print cycles commence, but that no characters are generated so that no heat is dissipated by the heat sink. During the print cycles, transistor switches 130 and 134 are turned "off." When transistor 134 is turned "off," output stages 136 and 138 are connected in the feedback loop so that the output 140 is at a level determined by the setting of variable resistor 148. Since no elements of the matrix are active, output 156 turns transistor 160 "on" so that the voltage at point 125 remains at ground potential and capacitor 118 is not charged.

Assume now that a series of characters are to be printed at a relatively high rate utilizing more than nine elements of the matrix. When transistors 130 and 134 are initially turned "off," the output voltage at 140 is determined essentially by the setting of resistor 148. During each print period, however, the capacitor 118 is charged at a rate determined primarily by the setting of variable resistor 128 with a pulse having an amplitude determined by the setting of resistor 124. During each nonprinting interval, the charge on capacitor 118 discharges through variable resistors 120 and 148. As the charge on the capacitor 118 increases, the current discharged through the resistors 120 and 148 increases, thus tending to reduce the voltage required at the output 140 necessary to balance the amplifier 112. As the printing cycles continue, the buildup of heat in the heat sink 108 decreases the resistance of thermistor 110, thus lowering the potential at the noninverting input 113, which also lowers the output voltage. The charging of capacitor 118 during the print cycle and the discharging of the capacitor during the nonprinting cycle simulates the rate at which the matrix 142 is heated and cooled relative to the temperature of the heat sink 108, thus compensating for the thermal propagation delay from the matrix to the thermistor 110.

Since the rate at which heat is added to the matrix is also dependent upon the number of thermal elements energized, the rate at which capacitor 118 is charged during the print cycle is adjusted by operation of switches 158 and 160. If nine or less, but seven or more elements of the matrix are energized, character generator 152 turns "on" transistor 158 so that the amplitude of the pulse used to charge capacitor through resistor 128 is reduced in amplitude by a percentage determined by the setting of resistor 162. If six or less elements are energized, the character generator 152 turns transistor 160 "on" and no charge is applied to capacitor 118. Thus, the voltage applied at the noninverting input 113 of the amplifier 82 is a measure of the temperature of the thermistor 110 and the charge on the capacitor estimates the difference in temperature between the matrix 142 and the thermistor prior to the start of the printing cycle. The collector supply voltage, and hence the power, applied to drive the matrix is then set at a level related to the absolute temperature of the matrix during the succeeding print cycle so that the temperature necessary to produce a uniform print density under all conditions will be achieved at the matrix.

Although specific embodiments of the invention have been described in detail, it is to be understood that various changes, substitutions and alterations can be made therein without departing from the spirit and scope of the invention as defined by the appended claims.

I claim:

1. In an electronic display device, the combination of:

a character matrix of thermally separated elements each including a heating element and switching means for controlling current through the heating element;

circuit means for binary character data generation for operating said switching means in a combination to heat the elements in a geometric pattern corresponding to the character represented by the character data; and circuit means for sensing the temperature of the matrix and adjusting a supply voltage applied to the resistive heating elements in response to the sensed temperature whereby the elements will be heated to a temperature within a predetermined temperature range to achieve uniform display density.

2. The combination defined in claim 1 wherein the last mentioned circuit means comprises;

means for sensing the temperature of the matrix during one period and storing a voltage representative of the sensed temperature during a subsequent period; and means for adjusting the voltage applied to the resistive heating element in response to the stored voltage.

3. The combination defined in claim 1 wherein the last mentioned means utilizes a PN junction to sense the temperature of the matrix.

4. The combination defined in claim 1 wherein the last mentioned means utilizes a temperature dependent resistance to sense the temperature of the matrix.

5. The combination defined in claim 1 wherein the last mentioned circuit means comprises:

an operational amplifier having noninverting and inverting inputs and an output connected to supply power to the resistive heating elements;

means for sampling and storing a voltage proportional to the temperature of the matrix during a sample period and storing the sampled voltage at one input of the amplifier during a print period; and feedback circuit means connecting the output of the amplifier to the other input of the amplifier whereby the output voltage of the amplifier will be proportional to the stored voltage.

6. The combination defined in claim 5 wherein the feedback circuit means includes:

a feedback resistance connecting the output to said other input;

a first adjustable voltage supply for producing a first voltage equal to the stored voltage;

a first adjustable resistor connecting the other input to the first adjustable voltage supply; and a second adjustable resistor connecting the other input to a voltage supply.

7. The combination defined in claim 6 further characterized by:

switch means for reducing the current required through the feedback resistance during the sample cycle to thereby reduce the output voltage.

8. The combination of claim 1 wherein the last mentioned circuit means comprises:

an operational amplifier having a noninverting input, an inverting input, and an output connected to supply power to the resistive heating elements;

first circuit means for establishing a first voltage at one input representative of the temperature of a temperature sensing element spaced from the matrix;

feedback circuit means for determining the gain of the amplifier including a feedback resistance connecting the output to the other input and a second resistance connecting the other input to a reference voltage;

second circuit means for increasing the current through the second resistance to compensate for the delay in the transfer of heat from the matrix to the temperature sensing element.

9. The combination of claim 8 wherein the second circuit means is responsive to the duration and rate of the period when printing, the duration of the period when not printing, and the number of resistive heating elements energized during the preceding print periods.

10. The combination of claim 9 wherein the second circuit means includes:

a capacitor having one plate connected to said one input of the amplifier;

a resistance connecting the other plate of the capacitor to the other input of the amplifier; and circuit means connected to said other plate for charging the capacitor during each print period with a pulse the amplitude of which is related to the number of heating elements energized.

11. In a system for printing on a thermally sensitive recording medium, the combination of:

a supporting chip;

a matrix of semiconductor elements mounted on the chip in thermally separated relationship;

a heating element formed in each semiconductor element;

a transistor diffused into each element for switching current through the heating element;

means for applying power across the heating elements and the respective switching transistors, and means for varying the voltage to said transistors to conduct variable current through the respective heating elements and produce a character of predetermined density on the thermally sensitive recording medium.

12. The combination of claim 11 wherein the voltage is related to the temperature of the matrix preceding the application of power.

13. In an electronic display device, the combination of:

a matrix of thermally separated elements each including a resistive heating means, the matrix having an "on" cycle during which selected elements are "on" to produce a character and an "off" cycle during which all elements are "off";

means for sensing the temperature of the matrix during the "off" cycle; and means for adjusting the power applied to the matrix during the "on" cycle in relation to the temperature of the matrix sensed during the "off" cycle to produce a predetermined temperature during the "on" cycle.

14. The method for printing electronically which comprises:

successively positioning a matrix of heating elements at a series of print positions of a thermally sensitive paper;

applying a supply voltage to the matrix at each position related to the temperature of the matrix after the print cycle at the preceding print position; and switching the supply voltage across selected heating elements of the matrix to produce a desired character image at each print position.

15. The method of claim 14 wherein the supply voltage at each print position is related to the temperature of the matrix during the "off" period preceding the print period.

16. The method of claim 15 wherein the supply voltage is referenced to the voltage across a PN junction disposed in close proximity to the matrix.

17. The method of claim 16 wherein the supply voltage at each print position is related to the temperature of the matrix at some point in time in the past and to the rate at which power was applied to the matrix since that point in time.

18. An electronic display device comprising:

a matrix of thermally separated elements each including a heating element;

means for sensing the temperature of said matrix; and means responsive to said temperature sensing means to control the temperature of said matrix of thermally separated elements.

19. An electronic display device comprising:
a matrix of thermally separated elements each including a heating element;
means for sensing the temperature of said matrix; and
means responsive to said temperature sensing means for adjusting the power applied to said matrix to produce a predetermined temperature at said matrix.

20. An electronic display device comprising:
a matrix of thermally separated elements each including a heating element;
means for sensing the temperature of said matrix; and
means responsive to said temperature sensing means to produce a predetermined temperature at said matrix.